Jan. 21, 1964 F. H. ATTIX 3,119,016
PHOTOCONDUCTIVE TYPE IONIZING RADIATION DETECTOR
Filed May 29, 1961
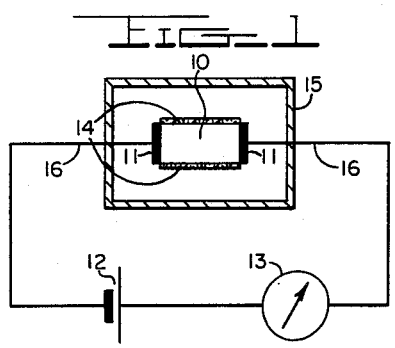
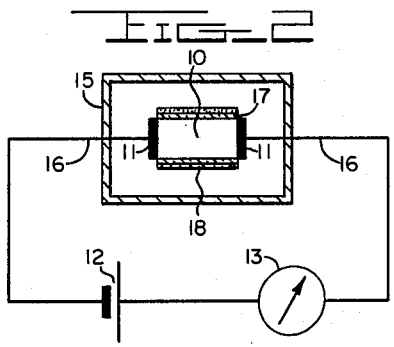
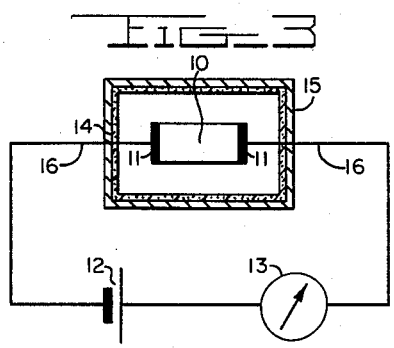
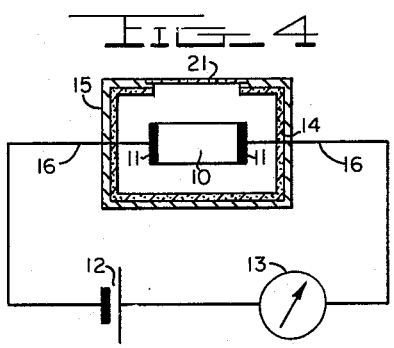
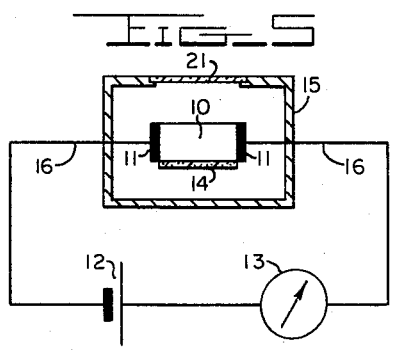
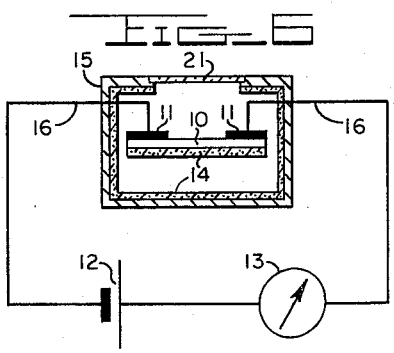
INVENTOR
FRANK H. ATTIX
BY
ATTORNEY United States Patent Office 3,119,016
Patented Jan. 21, 1964

3,119,016
PHOTOCONDUCTIVE TYPE IONIZING
RADIATION DETECTOR
Frank H. Attix, 5125 27th Ave. SE.,
Hillcrest Heights, Md.
Filed May 29, 1961, Ser. No. 113,564
1 Claim. (Cl. 250—71.5)
(Granted under Title 35, U.S. Code (1952), sec. 266)

The invention described herein may be manufactured and used by or for the Government of the United States of America for governmental purposes without the payment of any royalties thereon or therefor.

The present invention relates to photoconductive-type radiation detectors and more particularly to photoconductive-type radiation detectors which have an improved response characteristic.

Heretofore certain photoconducting materials such as cadmium sulfide crystals have been connected in a suitable electrical circuit, with an electric potential across the cadmium sulfide crystal, to detect light or ionizing radiation. In the absence of light or ionizing radiation, essentially no electric current flows through the crystal as there are very few electrons in the conduction energy band. In the event ionizing radiation or light of suitable wavelength is incident upon and penetrates into the crystal, electrons are dislodged throughout the crsytal, and elevated in energy to the conduction band. As long as the electrons remain in the conduction band, they contribute to the electrical conductivity of the crystal, and current will flow in the circuit including the crystal. However, these electrons escape from the conduction band by falling into certain trapping states, at impurity-sites throughout the crystal. In the absence of light or ionizing radiation incident on a cadmium sulfide crystal these traps are nearly all empty. Thus when the crystal is first exposed to light or ionizing radiation, the electrons which are initially projected into the conduction band are readily trapped, thus having short lifetimes in the conduction band, with a result that the conduction current is initially suppressed. The conduction current builds up slowly as the traps are filled; therefore, when detecting low intensities of light or ionizing radiation, the energy from the incident radiation is used in first filling the traps of the photoconductive material. Consequently, such photoconductive material does not detect and indicate the entire quantity of the incident radiation, nor does it respond promptly at the start of the exposure.

It is therefore an object of the present invention to improve the response characteristics of photoconducting materials such as cadmium sulfide when exposed to ionizing radiations or light.

Another object is to develop larger photocurrents by light or ionizing radiation exposures of short duration.

Still another object is to improve the response time of a photoconducting material to light or ionizing radiations.

Yet another object is to "condition" a photoconducting material to provide a quick response time to incident radiation.

Other and more specific objects of this invention will become apparent upon a more careful consideration of the following detailed description when taken together with the accompanying drawings, in which:

FIG. 1 illustrates a simple ionizing radiation detector circuit including a photoconducting material which has been partially or completely coated with a phosphor-radioactive-material mixture and which is protected from extraneous light by a light-opaque enclosure which admits ionizing radiations;

FIG. 2 illustrates a simple ionizing-radiation detector circuit including a photoconducting material which has been partially or completely coated with a phosphor layer with a layer of radioactive material affixed to the phsphor layer and enclosed within a light opaque enclosure;

FIG. 3 illustrates a simple ionizing-radiation detector circuit including a photoconducting material enclosed within an opaque housing with the interior surface of the enclosure partialy or totally coated with a layer of phosphor-radioactive material mixture;

FIG. 4 illustrates a simple light-detecting circuit including a photoconducting material which is enclosed in a housing having a transparent window for admitting a light signal to be detected wherein the housing is partially coated on its inner surface with a layer of phosphor-radioactive material mixture;

FIG. 5 illustrates a simple light-detecting circuit including a photoconducting material which is partially coated with a layer of phosphor-radioactive material mixture enclosed in an opaque enclosure which includes a light transparent window; and FIG. 6 illustrates a simple light-detecting circuit including a thin layer of photoconducting material with both electrodes attached to the same side and wherein a layer of phosphor-radioactive material mixture is coated on the back of the photoconductor, or on the inside surface of the surrounding housing as shown or both.

The present invention relates to a photoconductive type radiation detector which includes a photoconducting material which is responsive to incident light or ionizing radiation. The photoconducting material is "conditioned" by a self-powered light source comprising a phosphor plus a radioactive source to improve the response of the photoconducting material to any incident radiation.

The amount of phosphor and radioactive material used to "condition" the photoconducting material is chosen to be sufficient to keep the trapping sites nearly all filled even when the photoconductor is not being exposed to other light or ionizing radiation, but not so great as to produce an undesirably large photocurrent in the absence of such external radiation. By so exciting the electrons to keep the traps filled, any light or ionizing radiation incident on the photoconducting material will raise electrons into the conduction band, where they will remain for a much longer time than they would if the traps were empty and waiting to capture them. The photocurrent will consequently rise rapidly upon exposure, and reach an equilibrium value much faster. For the purposes of this invention the photoconducting material is considered to be "conditioned" when the source of radioactive material used in combination with the phosphor excites the electrons sufficiently to keep the trapping sites nearly all filled in the absence of any incident light or ionizing radiation.

Referring now to the drawings, wherein like reference characters represent like parts throughout, there is shown by illustration in FIG. 1 a simple ionizing-radiation detector circuit including a photoconducting material such as cadmium sulfide crystal 10 having electrodes 11 which are connected to an electrical power source 12 across the crystal with a meter 13 connected in the circuit which indicates the amount of radiation incident on cadmium sulfide crystal 10 in accordance with the amount of electrical current flow through the circuit. A phosphor such as ZnS:Ag is mixed with a radioactive material such as radium salt, krypton 85 or tritium in finely divided powder form, this powder is mixed with a binder, such as a solution of polystyrene in a suitable solvent. The resulting mixture is then applied to the surface of the photoconductor cadmium sulfide crystal with a brush, like painting an object. This mixture forms a coating 14 on the cadmium sulfide crystal the purpose of which will be explained later. The coated CdS crystal is enclosed in a light-tight envelope 15 for protection of the CdS crystal and to prevent light incidence on the crystal. Also the envelope affords a means of holding the CdS crystal in position in the envelope. As shown, the CdS crystal is held in position by the lead lines 16 which are connected to the electrodes 11 and which pass through the envelope. Any means well known in the art can be used to hold the CdS crystal in position without departing from the teaching of the invention.

FIGS. 2–7 are structural modifications of the device illustrated in FIG. 1 which makes use of the same teaching to "condition" a photodetecting material. FIGS. 2–7 illustrate the same electrical circuit with the differences relying in the manner in which the CdS crystal is "conditioned" and whether or not the system is to be used for light detection or for detection of ionizing radiation.

As shown in FIG. 2 the CdS crystal is coated with a layer of phosphor 17 which in turn is coated with a layer of radioactive material 18.

FIG. 3 illustrates a photoconducting material such as CdS crystal enclosed within an opaque housing 15 which is coated with a layer of phosphor-radioactive material mixture such as used in the illustration of FIG. 1. The phosphor-radioactive material mixture could be replaced by a layer of radioactive material and then a layer of phosphor with the phosphor on the side toward the photoconducting material.

FIG. 4 illustrates the photoconducting material positioned in an envelope which has a phosphor-radioactive coating on the inner surface thereon as shown in FIG. 3; however the envelope is provided with a transparent window 21 through which light may pass to the photoconducting material.

FIG. 5 illustrates a photoconducting material positioned within an envelope 15 which has a light admitting window 21. The photoconducting material has a layer of phosphor-radioactive material mixture 14 coated on the lower surface which does not interfere with incident light falling upon the photoconductor. If the layer is transparent to the incident light, then the photoconductor may be entirely rather than only partially coated. The window permits the entrance of light rays which are incident on the photoconducting material.

In FIG. 6 the photoconductor is made in the form of a thin strip with electrical contacts or electrodes on the upper surface, to optimize light sensitivity. The surface of the photoconductor opposite from the electrodes is coated with a layer of phosphor-radioactive material mixture as shown or with a layer of phosphor and then a layer of radioactive material as shown in FIG. 2. Also the phosphor-radioactive material mixture (or 2 tandem layers) may be coated on the inner surface of the envelope. The envelope also has an opening therein for admitting light rays.

In operation of the devices for carrying out the teaching of the invention, the photoconducting materials are conditioned by exposing the photoconducting material continuously to a low level of light generated by the phosphor such as ZnS:Ag which is made luminous by being intimately mixed with a suitable amount of radioactive material such as radium, krypton 85, or tritium. As shown in FIG. 2 the radiation source can be separated from the phosphor material and positioned adjacent thereto such that the radiation emanating from the radiation source is incident on the phosphor material. In each of the circuits shown the phosphor material is made luminous by the effects of the radiation source wherein the light given off by the luminous phosphor excites the electrons in the photoconducting material. The radiation source is in sufficient amounts only to make the phosphor luminous to the extent that the electrons in the cadmium sulfide crystal or other photoconducting material will fill the traps therein without causing an excessive current flow through the photoconducting material. The luminosity of the phosphor conditions the photoconducting material such that any light or ionizing radiation incident on the photoconductor will rapidly increase its electrical conductivity and will cause a current flow through the photoconducting material.

In carrying forth the teaching of the present invention for detection of light signals, devices as shown by FIGS. 5 and 6 can be used wherein the phosphor-radioactive source mixture (or separate tandem layers) only covers a portion of the photoconducting material, unless such layer or layers is or are transparent, in which case the photoconductor may be entirely coated. This phosphor-radioactive source will condition the photoconducting material as described above such that a weak light source incident on the photoconducting material on the uncovered portion will readily excite the electrons in the photoconducting material such that the weak light source can be detected with prompt response time. In the event the photoconductive material was not conditioned such as by the teaching of this invention any weak light source incident on the photoconductor would not be detected promptly because the energy of the light source would at first be used up in exciting the electrons to fill the traps of the photoconducting material.

The operation of the device is a two-step operation wherein the internal radioactive source causes the phosphor to luminesce wherein the light given off by the phosphor is employed to "condition" the photoconductor. In use as a detector any light or ionizing radiation incident on the photoconductor will cause a prompt current flow through the photoconductor. This current flow is measured by the meter 13 which can be calibrated in terms of incident radiation intensity.

In carrying out the teaching of the present invention, the radioactive source material is intimately mixed with a phosphor such as ZnS:Ag, or a radioactive source is positioned in contact with a phosphor closely coupled with the photoconductor. The $\alpha$- and $\beta$-rays, as well as the more penetrating $\gamma$-rays from the source material such as radium, strontium-90, krypton-85, or tritium thus interact efficiently with the phosphor to produce light. The phosphor is chosen to emit a wavelength or wavelengths of light which will be readily absorbed in the photoconducting material. For example, ZnS:Ag emits a blue-green light which is readily absorbed by a cadmium sulfide crystal photoconductor. Close optical coupling is arranged between the phosphor and the photoconductor such that energy is efficiently transferred from the phosphor to the photoconductor. By these procedures the amount of radioactive material necessary can be minimized, and sources such as strontium-90 and tritium (which produce no $\gamma$-radiation) utilized. The $\gamma$-ray hazard is thus eliminated. Prior art arrangements, wherein a source of radiation of relatively penetrating type, such as gamma rays or energetic beta rays is used in order to excite the photoconductor, are hazardous and expensive by comparison.

Obviously many modifications and variations of the present invention are possible in the light of the above teachings. It is therefore to be understood that within the scope of the appended claims the invention may be practiced otherwise than as specifically described.

What is claimed is:

A photoconductive detector system for detecting ionizing radiation which comprises:
  a light opaque envelope,
  said envelope passing said ionizing radiation to be detected,
  a photosensitive semi-conductor element secured within said envelope and connected in an electrical circuit,
  said electrical circuit including a power source and a meter to indicate the detection of any ionizing radiation,
  a radioactively-excited luminescent material positioned within said envelope relative to said semi-conductor element,
  said radio-actively-excited luminescent material producing a continuous low level light source incident on said semi-conductor element, said continuous low level light source produced by said radioactively-excited luminescent material having sufficient energy to continuously fill electron traps in said semi-conductor element and to raise electrons in said semi-conductor element up to a conductive band, whereby any ionizing radiation from an outside source of ionizing radiation to be detected that passes through said envelope and is incident on said semi-conductor element raises electrons in said semi-conductor element additionally into a conductive band which permits an electron flow through said meter as an indication of the amount of radiation incident on said semi-conductor element from said outside source.

References Cited in the file of this patent

UNITED STATES PATENTS

| | | |
|---|---|---|
| 2,899,560 | Nemet | Aug. 11, 1959 |
| 2,913,669 | Hebert | Nov. 17, 1959 |
| 3,030,509 | Carlson | Apr. 17, 1962 |